United States Patent
Wheeler

[19]

[11] Patent Number: 6,109,655
[45] Date of Patent: Aug. 29, 2000

[54] DEPLOYABLE VEHICLE BODY CURTAIN

[76] Inventor: George E. Wheeler, 8820 E. 62nd St., Raytown, Mo. 64133

[21] Appl. No.: 08/936,964

[22] Filed: Sep. 25, 1997

[51] Int. Cl.[7] .................. B60R 27/00; B26B 9/16
[52] U.S. Cl. .................. 280/847; 280/848; 280/154
[58] Field of Search .................. 280/847, 770, 280/848, 154; 150/166; 296/DIG. 1, 136

[56] References Cited

U.S. PATENT DOCUMENTS

| | | |
|---|---|---|
| 77,531 | 5/1868 | Ross . |
| 1,486,566 | 3/1924 | Crecelius .................. 296/152 |
| 2,933,750 | 4/1960 | Scott . |
| 3,237,964 | 3/1966 | Doyle . |
| 3,610,684 | 10/1971 | Richter .................. 296/132 |
| 3,907,752 | 9/1975 | Pelletier . |
| 4,688,824 | 8/1987 | Herring . |
| 4,750,767 | 6/1988 | Barnett .................. 293/128 |
| 4,938,522 | 7/1990 | Herron et al. .................. 296/136 |
| 4,940,276 | 7/1990 | Madison .................. 296/136 |
| 4,997,229 | 3/1991 | Swanson .................. 296/136 |
| 5,042,836 | 8/1991 | Swanson .................. 280/770 |
| 5,050,925 | 9/1991 | Brown .................. 296/136 |
| 5,075,917 | 12/1991 | Wheat . |
| 5,195,778 | 3/1993 | Dismuke .................. 280/770 |
| 5,275,460 | 1/1994 | Kraus .................. 296/136 |
| 5,358,268 | 10/1994 | Hawkins .................. 280/166 |
| 5,547,187 | 8/1996 | Spykerman .................. 296/37.18 |
| 5,829,775 | 11/1998 | Maxwell et al. .................. 280/507 |

*Primary Examiner*—Brian L. Johnson
*Assistant Examiner*—Bridget Avery
*Attorney, Agent, or Firm*—Hovey, Williams, Timmons & Collins

[57] ABSTRACT

A protective cover for a vehicle is provided which extends over a portion of the vehicle body to protect the user from soil accumulated on the exterior of the vehicle. The cover includes a sheet of thin, flexible material which is preferably designed for attaching to the interior of a vehicle by a securement member such as hook and loop material, snaps or the like. The a rib or other rigidifying member extends across the width of the sheet to aid in maintaining its extended condition, and may be sewn into a pocket as an aid to grasping. An attachment member releasably connects the sheet to a door of the vehicle so that when the door swings open, the sheet is tensioned and the attachment member releases to deploy the cover over the exterior of the vehicle. A weight is provided along the bottom margin of the sheet to assist in positioning the sheet in covering relationship over the vehicle exterior. Reflective pieces of fabric on the exterior side of the sheet aid both in reminding the occupant to restow the cover during reentry into the vehicle and perform a safety function to alert approaching drivers.

24 Claims, 2 Drawing Sheets

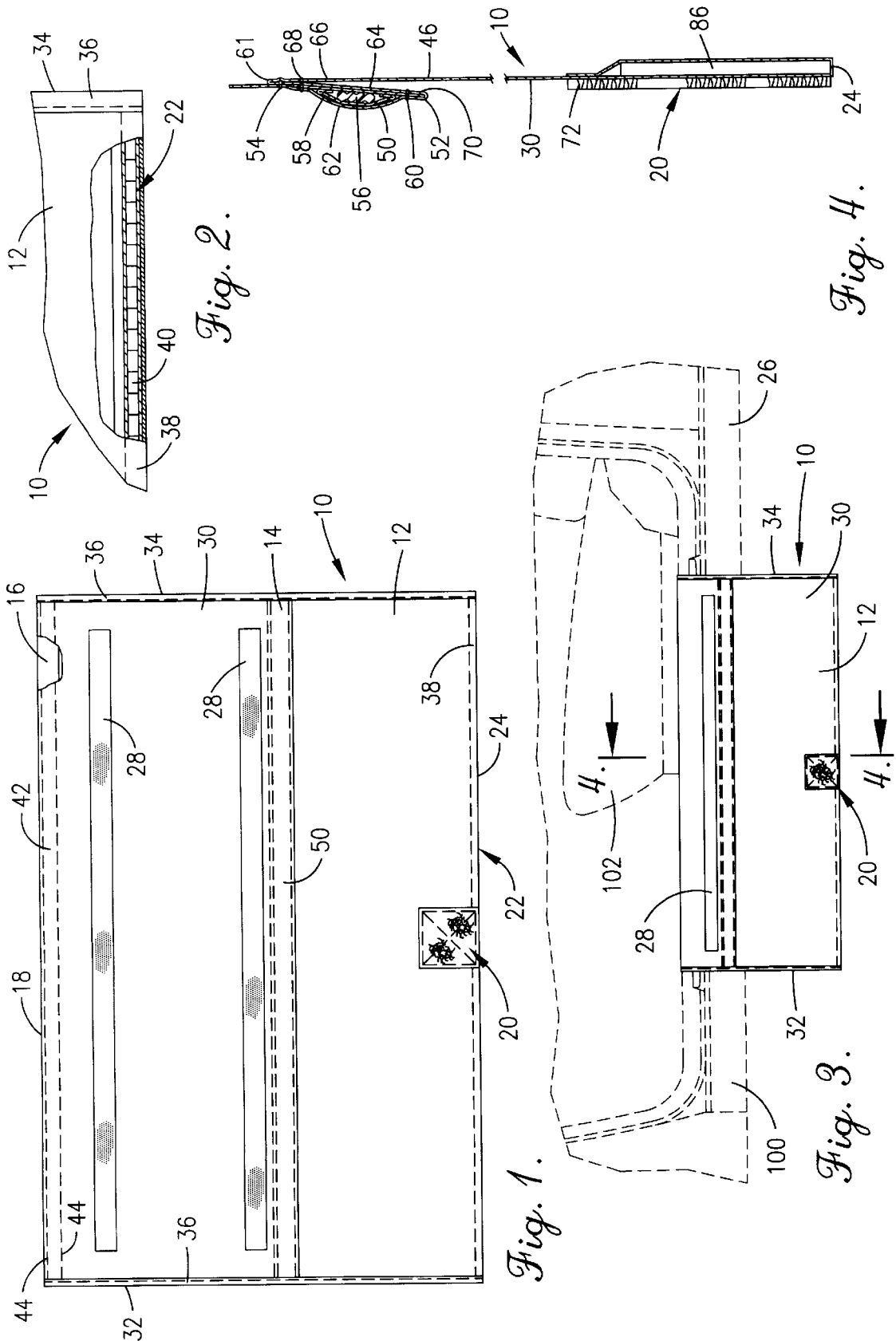

DEPLOYABLE VEHICLE BODY CURTAIN

BACKGROUND OF THE INVENTION

1. Field of the Invention

This invention broadly concerns a curtain of flexible material which may be attached to the interior of a vehicle and deployed over a portion of the exterior to provide a barrier to the transfer of soil from the vehicle exterior to a person in proximity to the vehicle. More particularly, the invention is concerned with a curtain which is provided with a rigidfying member which maintains the curtain in an extended position and aids in its positioning by the user.

2. Description of the Prior Art

Protective covers for vehicles have long been known since the time of carriages. For example, horse-drawn carriages could be provided with a step-cover, which was attached to a carriage door, fitting closely over the step, to prevent mud from being thrown onto the step by the wheels of the carriage, which was removed when the carriage door was opened. Another well known protective item known for vehicles is a "bra" which fits over the front of a vehicle to protect the paint finish from mud and debris. Fender covers are known for use by mechanics and the like to protect the paint finish of the vehicle from grease or scratches.

All of these protective items work well to protect a vehicle, or at least a portion thereof, from mud or debris which may attach thereto during use or in the garage. However, none of these items provides a means of inhibiting the transfer of soil or moisture from the vehicle to an occupant during ingress or egress from the vehicle.

Accordingly, there has developed a need for an inexpensive yet easy to use protective cover for a vehicle to protect the occupant and his or her clothing from soil on the vehicle during ingress and egress.

There is a further need for a protective cover which is easily deployable for use, and conveniently stowable when not in use.

Additionally, there is a need for a protective cover which can be readily cleaned and removed.

An additional need has been noted for a protective cover which is readily visible and can be seen at night when illuminated.

SUMMARY OF THE INVENTION

These and other objects are largely met by the protective cover of the present invention, which is inexpensive in construction yet versatile, easily deployable, and can be stowed when not in use.

The invention hereof broadly includes a sheet of flexible, preferably water repellant material which is provided with a rigidifying member. The rigidifying member is preferably sewn into the sheet in such a manner as to provide a flange for grasping. In addition, the sheet is preferably provided with an attaching member for releasable connection to a vehicle. The protective cover is preferably used in combination with a vehicle, whereby the cover is releasably connected to the vehicle door and more securely attached to the vehicle body, so that opening of the vehicle door automatically deploys the protective cover to drape over a portion of the vehicle exterior.

The protective cover may more preferably provided with additional features. For example, the sheet may be of a brightly colored or reflective material or provided with reflective strips to improve the visibility of the cover at night, thereby providing a safety feature to provide early warning to oncoming vehicles at night, and to aid in reminding users to return the protective cover to the interior of the vehicle. Loops or handles may be provided on the sheet to aid in deployment. Weights may be sewn into the sheet to improve its draping characteristics. The attaching member may be either one part of a hook and loop fastener, a magnet, or a combination of the two to provide the proper attachment to the vehicle door which then readily detaches as the door swings open. Furthermore, a securement member is provided at the opposite end of the sheet to retain the cover in attachment to the vehicle body during deployment, such securement member preferably including hook and loop material, snaps, or the like.

As a result of the invention hereof, a vehicle occupant may conveniently and inexpensively protect his or her garment from soiling during ingress, egress or working adjacent the vehicle. For example, the protective cover, which when stowed may be positioned between the seat and the side of the vehicle, is extended as the door is opened. When the door swings outwardly greater than the permitted extension of the cover, the attachment member automatically disengages from the door, with the cover then falling downwardly into covering position over the door sill, which in an automobile would be the rocker panel on the side of the car or the rear body panel and rear bumper for a trunk or rear door. The preferred embodiment uses a weighted bottom margin which improves the deploying characteristics, as does the rigidifying member which prevents the cover from folding and maintains its full and desired length. The securement member keeps a portion of the cover inside the vehicle and prevents the cover from falling free, thereby exposing the soiled vehicle body. When it is desired to stow the cover, the user need only grasp the rigidifying member and pull it into the vehicle. Once inside the vehicle, the user may reattach the attachment member to the door to ready it for future automatic deployment.

These and other advantages of the protective cover hereof will be readily apparent to those skilled in the art with reference to the following description and the drawings.

BRIEF DESCRIPTION OF THE DRAWINGS

FIG. 1 is a side elevational view of a first embodiment of the protective cover of the present invention, with a portion of the upper margin of the sheet broken away to show a securement member;

FIG. 2 is an enlarged, fragmentary side elevational view of a bottom corner of the protective cover of FIG. 1, showing a portion of the sheet broken away to show a weighting material;

FIG. 3 is a side elevational view of the protective cover as shown in FIG. 1 draped over a portion of a vehicle body, the vehicle being shown in phantom;

FIG. 4 is an enlarged fragmentary vertical cross sectional view of the protective cover shown in FIG. 1 taken substantially along line 44 of FIG. 3, showing the rigidifying member and the attachment member;

DESCRIPTION OF THE PREFERRED EMBODIMENTS

Figure 5:
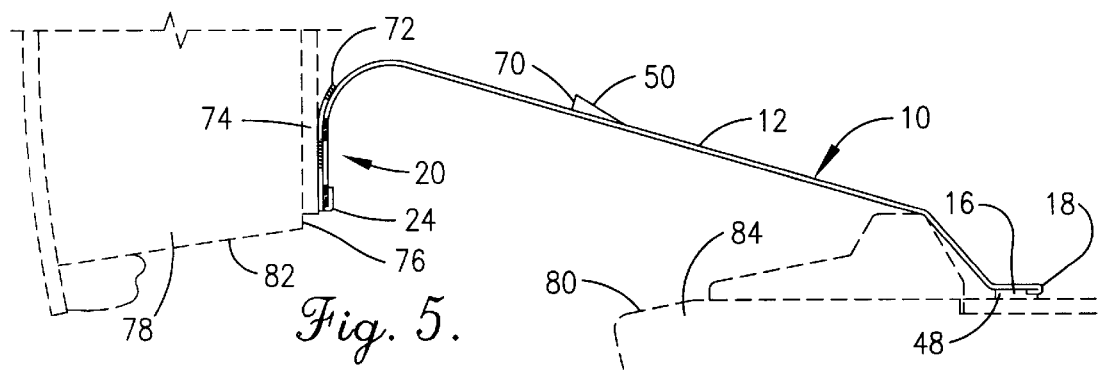
FIG. 5 is a side elevational view of the protective cover of FIG. 1 showing the protective cover deployed from a stowed condition and the attachment member releasing from a door of a vehicle.

Referring now to the drawing, a protective cover 10 as shown in FIG. 1 broadly includes a sheet 12 of thin, flexible, preferably water repellant material, a rigidifying member 14 attached to and extending a majority of the length of the sheet 12, and a securement member 16 located adjacent the upper margin 18 of the sheet 12. As used herein, the term "upper" and other directional indicators are only in reference to the drawings as an aid in understanding and are not intended to be limiting as to the orientation or manner of use except as indicated herein. In addition, the protective cover 10 includes an attachment member 20 and a weight 22 located proximate the lower margin 24 of the sheet.

In greater detail, the sheet 12 is preferably provided of coated nylon or other water repellant material which is suitably durable and flexible. The sheet 10 is preferably of a bright color which contrasts with the exterior color of the vehicle for improved visibility to thereby alert oncoming drivers to the fact that the vehicle is stationary, or may be of a color which the user selects to match or coordinate with the color of the interior or exterior of the vehicle 26, and provided with strips 28 of reflective or fluorescent fabric which are sewn or adhered to the sheet. Such strips 28 may be placed in any desired pattern on the exterior surface 30 of the sheet so as to be readily visible and reflect light cast thereon. A suitable material is Scotchlite™ reflective fabric by 3-M of St. Paul, Minn. The sheet 12 presents front and rear side margins 32 and 34 respectively, each covered with a selvage 36 of covering material sewn thereto or serging which provides stiffening reinforcement to the margins and inhibits the margins of the sheet 10 from unraveling.

The lower margin 24 is looped and sewn to provide therein a hem 38 which receives therein weight 22 as shown in greater detail in FIG. 2. The weight 22 is preferably somewhat distributed along the length of the lower margin 24 to allow the sheet 12 to fall and extend evenly as shown in FIG. 3. Most preferably, the weight 22 is provided as a leaded weight tape 40 which extends substantially the length of the lower margin 24, with a ⅛" diameter leaded tape as provided by Wright's of Warren, Mass. being particularly useful in the present application.

The upper margin 18 is similarly provided with a hem 42 formed by two parallel lines of stitching 44 to prevent unraveling and receives adjacent thereto on the rear surface 46 of the sheet the securement member 16. The securement member 16 is intended to connect the protective cover 10 to the vehicle 26, preferably securely but removably. For example, the securement member 16 may be a strip of hook material 48 which holds to the carpet of the interior of the vehicle as shown in FIG. 5 or to a separate strip of loop material affixed to the vehicle body. As shown in FIG. 5, the hook material used as the securement member is positioned on the floor pan proximate the vehicle seat, but an equally acceptable alternative placement is positioning the securement member 16 on the vertically inclined surface of the threshold, steplate or rocker panel facing the interior of the vehicle. This latter position provides less opportunity for a user to catch any portion of their shoe on the cover 10. Such hook and loop material is commonly sold under the trademark VELCRO. Other securement mechanisms may include snaps or hooks which attach the sheet 12 to the vehicle body.

The sheet 12 is folded or otherwise formed into a pocket 50 for receiving therein the rigidifying member 14. The pocket 50 is formed by a folding the sheet 12 along a first edge 52 and then providing a first line of stitching 54 to enclose the pocket 50. The rigidifying member 14 is preferably a synthetic resin boning rib 56 covered in a fabric sheath 58 which is provided as a unit. The rigidifying member is inserted into the pocket 50. A second line of stitching 60 is then sewn along the bottom of the pocket 50 and through the sheath 58 surrounding the boning rib 56. The sheet 12 is then folded again to present a second edge 61 and a first pocket layer 62, a second pocket layer 64 and an underlying layer 66. A third line of stitching 68 is sewn through the layers 62, 64 and 66 and through the portion of the fabric sheath 58 opposite the second line of stitching 60. A shelf 70 is thus presented between the pocket 50 and the underlying layer 66, the pocket being rigidfied by the member 14 and also by the selvage 36 sewn onto the side margins 32 and 34. One of the reflective strips 28 may be positioned over the pocket 50 and thus secured by lines of stitching 54 and 60 as opposed to the location shown in FIGS. 1 and 3.

Attachment member 20 is secured to sheet 12 by sewing, adhesive, snaps or other means. One preferable attachment member is a web 72 which may be either hook material or loop material as used in VELCRO hook and loop fasteners. A cooperative piece 74 of the material (e.g. hook material when the web 72 is loop material or, when web 72 is hook material, the cooperative piece 74 is loop material) is affixed to the interior 76 of the door 78 swingably mounted on the vehicle body 80 as shown in FIG. 5, or of equal or better utility, the piece 74 of material may be affixed to the underside 82 of the door 78 posterior to the weatherstrip and above the rocker panel 84. Thus, when hook material is provided as the web 72, loop material would be used as the piece 74, and vice versa. Alternatively, or in addition thereto, the attachment member 20 may be a magnet 86 which may be attached to the sheet 12 in any desired manner, one structure shown herein is having the magnet 86 enclosed within the web 72 as shown in FIG. 4. When the door 78 is of ferromagnetic material, the magnet 86 thus temporarily and releasably attaches the sheet 12 adjacent the lower margin 24 to the door 78. The magnet 86 also provides additional weighting to provide proper draping of the sheet 12.

Figure 6:
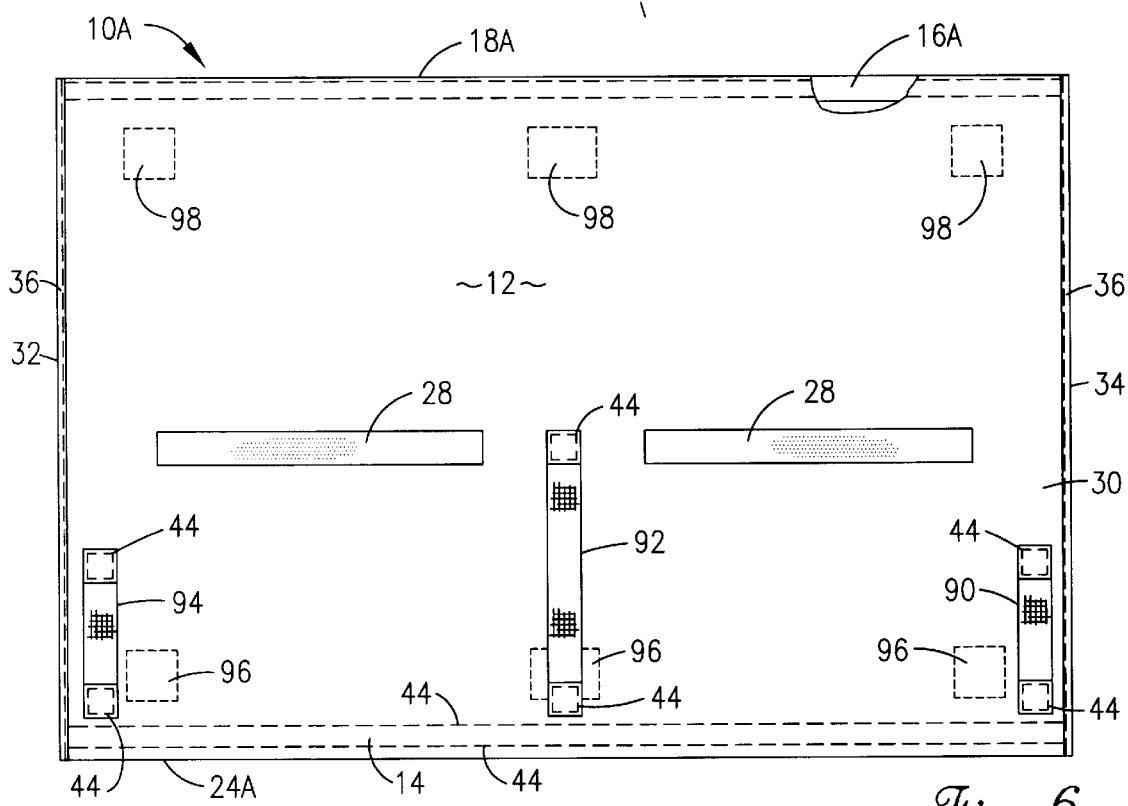
FIG. 6 is a side elevational view of a second embodiment of the protective cover of the present invention wherein the rigidifying member is positioned adjacent the bottom margin of the sheet.
Figure 7:
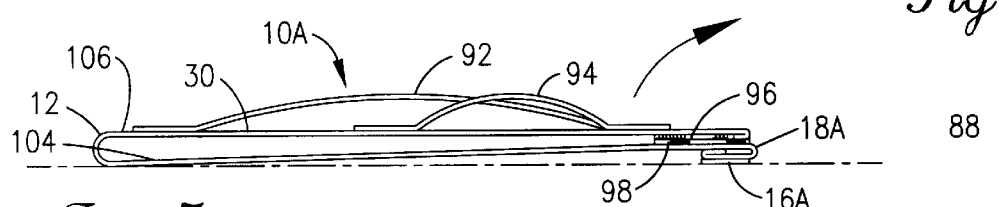
FIG. 7 is an end view of the protective cover of FIG. 6 showing it in a stowed condition on the floor of a vehicle with the arrow indicating the movement of the bottom end of the sheet during deployment.
Figure 8:
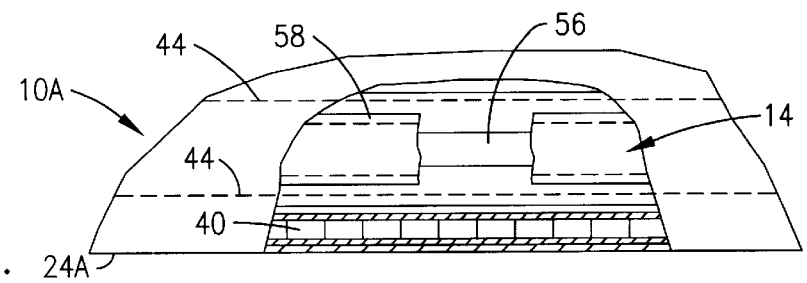
FIG. 8 is an enlarged, fragmentary side elevational view of the protective cover of FIG. 6, with a portion of the sheet removed to show the rigidifying member and weight.

FIGS. 6, 7 and 8 illustrate a protective cover 10A which is an alternate embodiment of the present invention more suited to use elevated decks 88 or trunks of vehicles where the user would approach the vehicle 80 normally from the exterior rather than from a seated position.

As shown in FIG. 6, protective cover 10A is similar to the embodiment of the protective cover 10 shown in FIG. 1, and can be either retained in the trunk or rear compartment of the vehicle until manually positioned or may be self-deploying when the rear door or trunk lid is opened. The reinforcing member 14 is as described above but located adjacent the lower margin 24A. Grab handles 90, 92 and 94 are provided to permit the user to easily manually deploy the cover 10A. The securement member 16A, in the form of either hook material or loop material, or alternatively snaps or other releasable closures, is located adjacent the upper margin 18A. To make the cover 10 more compact, hook material 96 and loop material 98 are sewn or otherwise permanently affixed to the interior side 106 of the sheet 12A. While three pairs of hook and loop square 96,98 are shown in FIG. 6, it may be appreciated that any number of such pairs of squares may be provided across the width of the sheet 12 between side margins 32 and 34 depending on the width of the sheet 12 and the amount of attachment desired when the cover is in the folded position shown in FIG. 7. Thus, when the cover 10A is stowed in the folded position as shown in FIG. 7, the hook material 96 is releasably connected to the loop material. Alternatively, the cover 10A may be used in a manner similar to the cover 10 as shown in FIG. 5, where the hook material 96 is instead attached to a cooperative piece 74 of loop material attached to the door 74 when such door is a rear door or trunk lid pivotable about a substantially horizontal axis. Thus, cover 10A may also include an attachment member as shown in regard to the embodiment shown in FIG. 1, such as a magnet or hook and loop material, for temporary and releasable attachment to a door adjacent the deck or trunk.

In use, the protective cover 10 is connected to the vehicle by securement member 16 adjacent its upper margin 18. When the interior of the vehicle is carpeted, a sufficient mechanical connection may be obtained with the securement member 16 is a length of hook material 48 constructed to attach to carpet fibers. If this is an inadequate connection, loop material 98 may be permanently affixed to the vehicle, or snaps or other closures which connect to the sheet 12. It may be understood that the loop material may be sewn to the sheet 12 while the hook material sewn or adhered to the carpet with equivalent effectiveness. The lower margin 24 is then placed in proximity to the door 78 and the sheet 12 releasably connected thereto by attachment member 20. It is to be understood that the attachment member 20 is more readily detached from the door 78 than securement member 16 may be detached from the interior of the vehicle 80. In this stowed position, the protective cover 10 is attached to both the interior of the vehicle body 100 by the securement member 16 and the door 78 by the attachment member 20, with the cover therebetween preferably located between the vehicle seat 102 and the door 78 to facilitate deployment.

The protective cover 10 is automatically deployed when the occupant opens the door 78 to exit the vehicle 80. As the door swings open as shown in FIG. 5, the attachment member 20 begins to detach from the door 78 as the sheet 12 is tensioned by the displacement of the door 78 relative to the vehicle body 100. When the tension on the sheet 12 exceeds the holding capacity of the attachment member 20, which may either be the magnetic force between the magnet 86 and the door 78, or the web 72 detaches from the cooperating piece 74, or both. When detached, the sheet 12 falls downwardly under the influence of gravity aided by the density provided by weight tape 40 along the lower margin 24 to cover the rocker panel 84 of the vehicle 26. The thin material used in sheet 12 permits the door 78 to be closed over the sheet 12. Thus the user may stow the protective cover 10 after exiting the vehicle or close the door and leave the cover 10 deployed. After re-entering the vehicle, the user may readily stow the protective cover 10 by holding the cover 10 at the rigidifying member 14 and placing the sheet 12 at a convenient location within the vehicle. The rigidifying member 14, in cooperation with the selvage 36 along the margins 32 and 34, permits the sheet to remain extended fore and aft. The user may then reattach the attachment member 20 to the interior or underside of the door to ready it for automatic deployment when the door is again opened.

The protective cover 10A is similar in operation. The cover 10A is attached to the trunk or deck 88 of a vehicle 26 by the securement member 16A, which may be hook or loop material or snaps, buttons and the like, attaching to the other of the hook and loop component or the snap receiver affixed to the vehicle 26. The cover 10A is folded as shown in FIG. 7 when used on a relatively horizontal surface such as deck 88, or when stowed in the trunk of passenger vehicle will be oriented 90 degrees counterclockwise to hang vertically from the back wall of the vehicle's trunk. The sheet 12 has an exterior side 104 which is intended to remain relatively clean so as not to soil the user, and an interior side 106 which may contact the exterior of the vehicle and thus become soiled. In this position, the interior side 106 adjacent the upper margin 18A is provided with the securement member 16A and thus attaches to the vehicle 26, with the sheet 12 folded so that the exterior side 106, which should remain oriented away from the exterior of the vehicle when deployed, faces out. The user may affix the hook material 96 adjacent the lower margin 24A to corresponding loop material provided on the rear door or trunk lid of the vehicle to thereby act as an attachment member and thus automatically deploy in the same manner as protective cover 10. When doing so, as the door raises, the lower margin 24A swings out to carry beyond the rear bumper of the vehicle before the attachment member detaches from the door 74 and the cover 10A then falls over the part of the bumper and vehicle body 100 therebeneath. Alternatively, the user may find it more convenient to attach the hook material 96 to loop material 98 on the bottom side 104 adjacent the bottom margin 24A, thereby having the user deploy the cover 10A by grasping handles 90, 92 or 94. When the user pulls on any one of the straps, the rigidifying member 14 inhibits the lateral shortening or collapse of the sheet 12, and the leaded weight tape 40 aids in deploying the cover 10A over the back of the vehicle to cover, e.g., the bumper, while the user leans on the cover 10A while accessing the deck 88. It is to be understood that the cover 10A may be sized and configured differently for different styles and models of vehicles, such that recesses and cutouts may be provided to accommodate trunk latching mechanisms or the like.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, it is regarded as equivalent to switch the location of hook material and loop material as described herein, and it is to be understood that the types of vehicles set forth herein are not limited to automobiles but may include aircraft, trucks or the like which have a door, hatch or the like for gaining access to the interior. The rib could also be attached with an adhesive, or the rib and its surrounding fabric prepared as a subassembly prior to stitching to the sheet.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. A protective cover adapted for attachment to a vehicle comprising:

a sheet of thin, flexible material presenting an exterior side, an interior side, an upper margin, a lower margin and a pair of spaced-apart side margins presenting a width therebetween;

a securement member attached to the sheet adjacent the upper margin for securing the sheet to the vehicle; and a rigidifying member attached to the sheet so as to be spaced from the upper margin, said rigidifying member extending a substantial portion of the width of said sheet without projecting beyond the side margins of the sheet wherein said rigidifying member is attached by sewing to said sheet intermediate said upper and lower margins, said rigidifying member including an elongated rib.

2. A protective cover as set forth in claim 1, wherein the rigidifying member includes a sheath substantially surrounding said rib, and including stitching attaching said sheath to said sheet.

3. A protective cover as set forth in claim 1, wherein the sheet is folded and sewn into a pocket with said rigidifying member sewn therein.

4. A protective cover as set forth in claim 3, wherein stiffening material is sewn to said side margins.

5. A protective cover as set forth in claim 1, including reflective material sewn to the exterior side of said sheet.

6. A protective cover as set forth in claim 1, including a weight attached to said sheet proximate said lower margin.

7. A protective cover as set forth in claim 1, including an attachment member secured to said sheet adjacent said bottom margin for releasably attaching said sheet to a vehicle door.

8. A protective cover as set forth in claim 7, wherein said attachment member is a magnet.

9. A protective cover as set forth in claim 7, wherein said attachment member is one of hook and loop fabric.

10. A protective cover as set forth in claim 1, including at least one handle attached to said exterior side of said sheet.

11. A protective cover as set forth in claim 1, including hook and loop fabric material secured to said interior side of said sheet adjacent said upper and lower margins for releasably retaining said sheet in a folded condition.

12. A system for protecting a person from soil accumulated on the exterior of a vehicle comprising, in combination:

a vehicle having an interior, an exterior and a door mounted for swinging between a closed and an open position;

a sheet of thin, flexible material presenting an exterior side, an interior side, an upper margin, a lower margin and first and second spaced apart side margins defining a width therebetween;

a securement member connecting said sheet adjacent its upper margin to the interior of said vehicle proximate said door; and an attachment member releasably connecting said sheet adjacent its lower margin to said door, whereby swinging said door from its closed position to the open position detaches said sheet from said door without disconnecting said securement member from said vehicle.

13. A system as set forth in claim 12, including a rigidifying member attached to said sheet and extending a majority of the width thereacross.

14. A system as set forth in claim 13, wherein the rigidifying member is sewn to the sheet intermediate the upper and lower margins.

15. A system as set forth in claim 14, wherein the sheet is folded and sewn into a pocket with said rigidifying member sewn therein.

16. A system as set forth in claim 15, wherein stiffening material is sewn to said side margins.

17. A system as set forth in claim 12, including reflective material sewn to the exterior side of said sheet.

18. A system as set forth in claim 12, including a weight attached to said sheet proximate said lower margin.

19. A protective cover adapted for attachment to a vehicle comprising:

a sheet of thin, flexible material presenting an exterior side, an interior side, an upper margin, a lower margin and a pair of spaced-apart side margins presenting a width therebetween;

a securement member attached to the sheet adjacent the upper margin for securing the sheet to the interior of a vehicle; and an attachment member secured to the sheet adjacent the lower margin for releasably connecting said sheet to a vehicle door, said attachment member requiring less force to detach from a door than the force required to detach the securement member from the vehicle interior.

20. A protective cover as set forth in claim 19, wherein said attachment member is hook and loop fabric.

21. A protective cover as set forth in claim 19, wherein said attachment member is a magnet.

22. A protective cover adapted for attachment to a vehicle comprising:

a sheet of thin, flexible material presenting an exterior side, an interior side, an upper margin, a lower margin and a pair of spaced-apart side margins presenting a width therebetween;

a securement member attached to the sheet adjacent the upper margin for securing the sheet to the vehicle;

a rigidifying member attached to the sheet so as to be spaced from the upper margin, said rigidifying member extending a substantial portion of the width of said sheet without projecting beyond the side margins of the sheet; and at least one handle located on the exterior side of the sheet below the upper margin thereof so as to facilitate user manipulation of the cover.

23. A protective cover as set forth in claim 22, wherein said handle presents an internal pocket, said rigidifying member being located within said pocket.

24. A protective cover as set forth in claim 23, wherein said handle is defined by multiple folds in the sheet.

* * * * *